June 29, 1965 G. G. MURPHY 3,192,319

FACSIMILE PHASING MECHANISM

Filed May 31, 1962 2 Sheets-Sheet 1

INVENTOR
GERALD G. MURPHY
BY Edward V. Connors
ATTORNEY

June 29, 1965 G. G. MURPHY 3,192,319

FACSIMILE PHASING MECHANISM

Filed May 31, 1962 2 Sheets-Sheet 2

INVENTOR
GERALD G. MURPHY
BY Edward T. Connors
ATTORNEY

United States Patent Office 3,192,319
Patented June 29, 1965

3,192,319
FACSIMILE PHASING MECHANISM
Gerald G. Murphy, Clifton, N.J., assignor to Hogan Faximile Corporation, New York, N.Y.
Filed May 31, 1962, Ser. No. 199,109
6 Claims. (Cl. 178—69.5)

The present invention relates to electric facsimile systems and more particularly to a phasing mechanism for phasing a facsimile recorder.

In electrical facsimile systems graphic material such as pictures, drawings, printed or typed material or the like is scanned and the information converted into electric facsimile signals which are used either locally or remotely to produce a recorded "facsimile" of the original or subject copy.

In a typical facsimile transmitter subject copy is continuously moved past a scanning area where it is illuminated and its reflected image is focussed on a scanner which converts the scanned information into a series of trains of electric video signals. A so called "backstroke interval" is provided between each train of electric video signals for the transmission of phasing or other signals.

In a typical facsimile recorder means are provided by which an electrolytic recording medium from a supply roll is continuously moved between a fixed linear electrode and a helical electrode which is rotatably carried by a drum. The recording is made by the passage of the electric video signals through the recording medium.

The signal input to the receiver is a series of trains of electric video signals each train representing a line of information across the copy, while the sequential trains of signals represent the information line by line along the length of the scanned copy. Between each train of electric video signals, and during the backstroke interval, a phasing pulse is transmitted which is separated at the receiver to control phasing mechanism. The phasing mechanism is used to properly phase the recorded copy responsive to the transmitted phasing pulses. Proper phasing is accomplished when the received video signal for each line of scan is recorded starting at the lefthand margin of the recording medium. The phasing mechanism of the recorder includes a driving means such as a motor and controlled interconnecting means between the driving means and the helix so that the helix can assume a desired angular position with respect to the driving means in order that the recording is made with the scanned line starting at the lefthand margin.

Inasmuch as the train of electric video signals may be started anew for each sheet of subject copy transmitted, or because of line interruptions or the like, it is necessary that the phasing mechanism be quickly operated. Further, to achieve accuracy in the recording, the angular increments of lock-in position of the phasing mechanism should be small so that the start of each line of recording is accurately positioned on the recording medium.

Heretofore means to accomplish this purpose have included control means for momentarily interrupting the supply to a synchronous driving motor for the recorder so that the motor "slips a pole" and thus provides a phasing or framing action of the rotatable member. Other constructions have used differential gear means between the driving means and the rotatable means for the recorder. In some cases the differential means has required the use of two motors.

The present invention aims to provide an improved phasing mechanism utilizing a single driving motor which is maintained energized during the phasing operation.

In accordance with the invention this is accomplished by providing releasable escapement means between the driving means and the helix of the recorder so that the phased position of the driven means and the helix may be changed by a control responsive to phasing pulses received with the incoming signal.

The construction in accordance with the invention is advantageous in that any desired number of stepping increments may be provided so as to achieve the desired accuracy in recording the video signal for each line of scan starting at the left hand margin of the copy.

Another object of the invention is to provide a phasing mechanism which is simple and economical in manufacture, efficient in operation, and durable in use.

Other objects and advantages of the invention will be apparent from the following description and from the accompanying drawings, which show, by way of example, an embodiment of the invention incorporated with recorders utilizing various principles of operation.

Figures 1, 2:
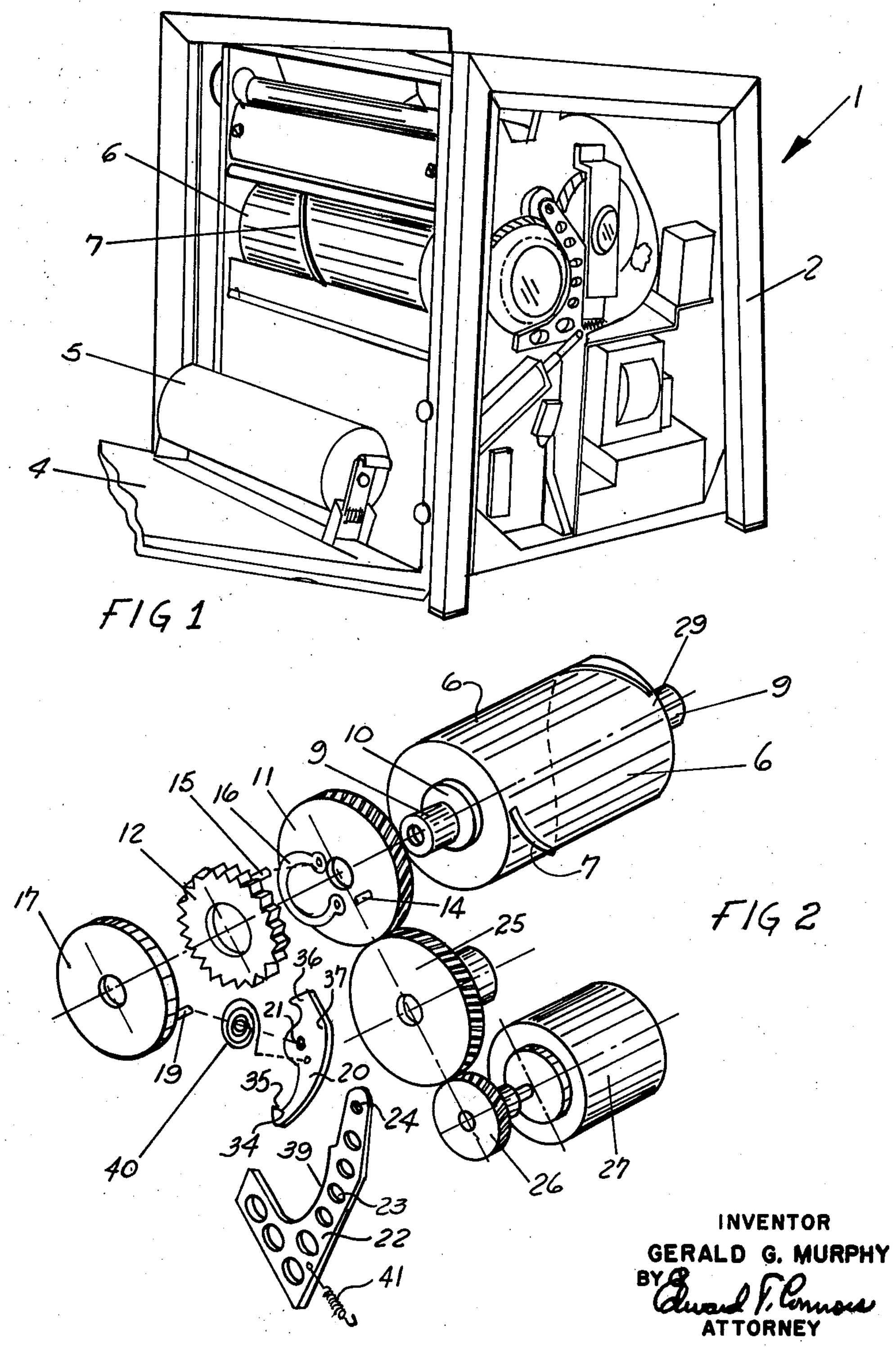
FIGURE 1 is a perspective view of a facsimile recorder incorporating a phasing mechanism in accordance with the invention, the side panel of the recorder being removed and the front cover shown as partially broken away.
FIGURE 2 is an exploded view of the phasing mechanism in accordance with the invention.

Referring to the drawings there is shown in FIGURE 1 a recorder 1 in accordance with the invention and including a frame 2 having a hinged front cover 4 for the support of a roll 5 of electrolytic paper. A recorder drum 6 carries a helix electrode 7 for cooperation with a linear electrode not shown but which may be positioned on the front cover 4, the action of the helix linear electrodes being well known in the art.

The helix drum 6 is fixedly carried on a shaft 9 supported by the frame 2. At the outer end of the helix drum 6 is a bushing 10 positioned about the shaft 9. A driving gear 11 is rotatably carried by the shaft 9. A ratchet wheel 12 is rotatably positioned on the hub of a supporting disc 17 (FIG. 4) outwardly of the driving gear 11. The driving gear 11 carries a pin 14 and the ratchet wheel 12 carries a mounting pin 15. A coupling spring 16 is engaged at its ends in the pins 14 and 15 and provides a certain amount of resiliency between the driving gear 11 and the ratchet wheel 12. The pawl supporting disc 17 is fixedly attached to a collar 18 which is keyed to the shaft 9 as indicated at 18*a* (FIGURE 4) outwardly of the ratchet wheel 12. A pawl pivot pin 19 is carried by the pawl supporting disc 17 on its inner side at an angular position explained later. An escapement pawl 20 is journalled as indicated at 21 so as to be pivotably supported on the pawl pin 19.

In juxtaposition to the pawl 20 is an actuating shoe 22 pivoted at its upper end at 24. The driving gear 11 may be driven by an intermediate gear 25 rotated by a pinion 26 on the drive shaft of motor 27.

Figures 3, 4, 5:
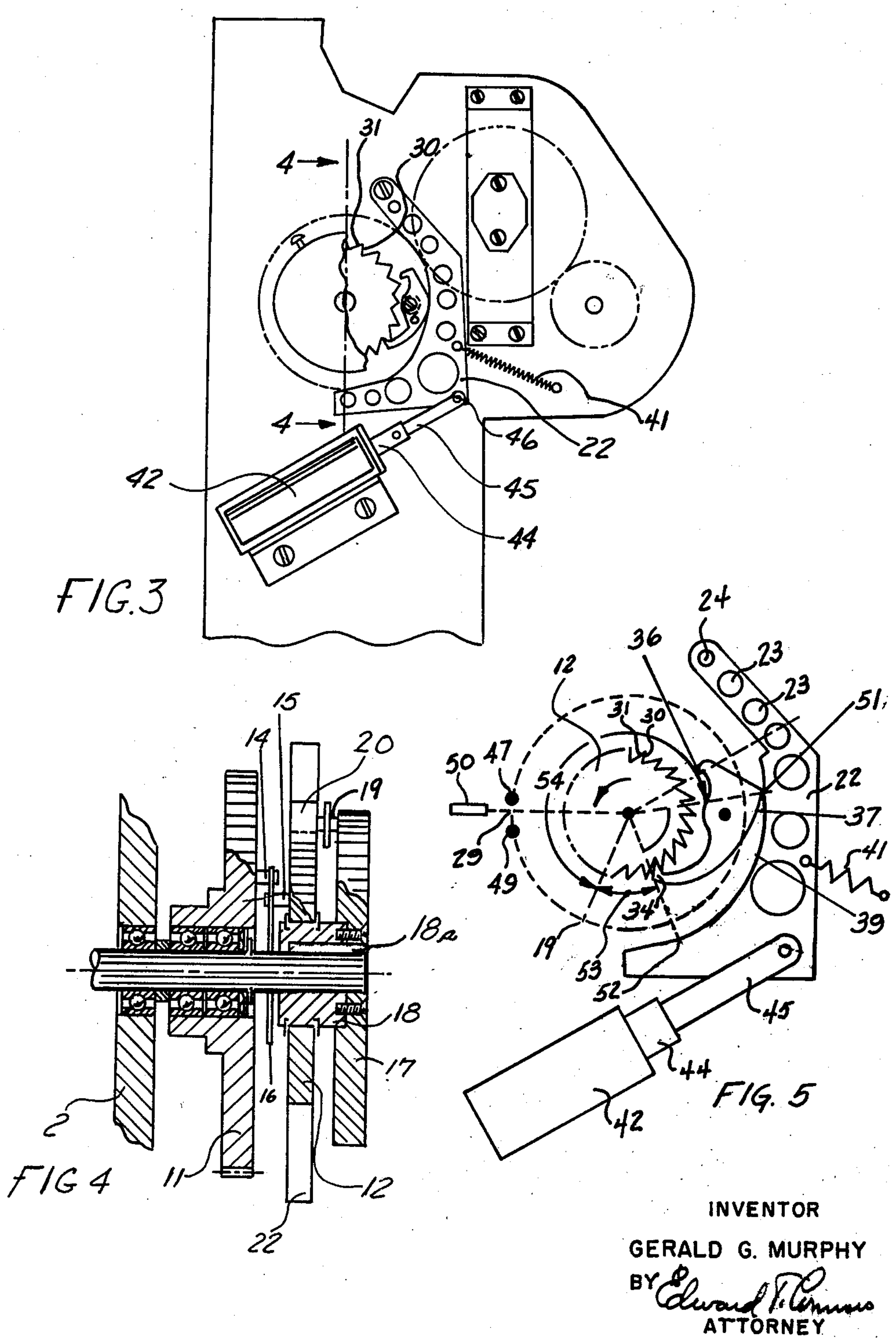
FIGURE 3 is a side view of a portion of the recorder showing the phasing mechanism.
FIGURE 4 is a sectional view taken along the lines 4—4 of FIGURE 3.
FIGURE 5 is a schematic view of a side view of the phasing mechanism showing an angular relationship of the positioning of the parts.

The helix 7 is wound on the drum 6 in a helical path falling slightly short of a full revolution so as to provide a backstroke interval or portion 29 of about 5% of a revolution. The ratchet wheel 12 is provided with teeth having a stop surface 30 and a sliding surface 31 (FIGURE 5).

In a commercial embodiment of the invention wherein the operative length of the helix is such as to make an 8¼" recording it has been found desirable to make the ratchet wheel 12 with thirty teeth. This number has been selected so as to provide phasing increments of one thirtieth of a revolution for each tooth. Thus the effective resolution of the phasing position along the scan line is a one tooth increment on the ratchet wheel thereby insuring accurate phasing of the recording within one thirtieth of the effective length of the scanning line or approximately three tenths of an inch. The phasing resolution depends upon the formula $1/n$ where $n$ equals the number of teeth on the ratchet wheel. The phasing resolution is achieved regardless of the drum rotational speed, and as may be noted from the formula, may be increased to any desired degree by increasing the number of teeth on the ratchet wheel 12.

Leading or forward tooth 34 of the pawl 20 has a tooth engaging surface 35 formed of an angle matching the angle of the stop face 30 of the teeth of the ratchet wheel 12. Trailing or rear tooth 36 of the pawl 20 has a rounded tip to slide over successive sliding surfaces 31 of the teeth of the ratchet wheel 12 and abut against the stop faces 30 thereof. The spacing or the pitch of the forward tooth 34 and of the rear tooth 36 of the pawl 20 being such with respect to the tooth pitch of the ratchet wheel 12 as to effect release of a ratchet tooth for each cyclic operation of the pawl 20.

The pawl 20 has on its side opposite the teeth 34 and 36 a cam surface 37 positioned generally behind the rear tooth 36. The pawl 20 may be made of nylon to provide quiet operation of the mechanism. The shoe 22 has a cam surface 39 adapted to cooperate with the cam surface 37 so that when contact is made therebetween the forward tooth 34 is swung away from the teeth of the ratchet wheel 12 and a tooth of the ratchet wheel 12 is engaged by the rear tooth 36. The resulting action is that the pawl and the attached helix drum slips rearwardly a step. The cam surface 39 is shaped as an arc of a circle for ease in manufacture and makes contact with the cam surface 37 during approximately one quarter of a revolution of the drum 6.

A coil spring 40 is positioned about the pawl pivot pin 19 and secured in position at one end to the pawl supporting disc 17, and at its other end to the pawl 20, so as to normally urge the forward tooth of the pawl 20 into engagement with the teeth of the ratchet wheel 12. A return spring 41 is attached at one end to the actuating shoe 22, and at its other end to a convenient location on the frame 2, so as to normally withdraw the actuating shoe 22 from contact with the pawl 20. The actuating shoe 22 may be made of any suitable material such as a phenolic resin and may be lightened in weight by openings 23. In order to move the actuating shoe 22 into contact with the pawl 20 any suitable mechanical means may be used such as an electric solenoid 42. The solenoid 42 has a plunger 44 connected by an operating link 45 to the actuating shoe 22 by a connecting pin 46.

In FIGURE 5 there is shown a schematic drawing indicating the arrangement of the parts so that a reliable actuation is had of the phasing means. In FIGURE 5 the backstroke interval 29 of the helix 7 is indicated as being between the points 47 and 49, a linear electrode being indicated by the rectangularly shaped member 50. The position at which the pawl cam surface 37 first contacts the cam face 39 of the shoe 39 upon an operation of the shoe 22 is indicated as 51, and the position at which it leaves the shoe 39 is indicated at 52. The preferred angular position of the pawl pivot 19 on the disc 17, with the backstroke interval 29 being opposite the linear electrode 50, should be within the angle 53. The angle 53 is located preferably less than 90 degrees from the point 52. This is a matter of dynamics and depends upon the characteristics of the parts. The actual setting is a matter of experiment and seems not too critical within these limits. By positioning the pawl pivot 19 within the angle 53 there is time, as expressed by angle 54 to point 51 for the necessary control circuit operation for coincidence checking, and for mechanical deactivation of the phasing mechanism including the actuating shoe 22. In the present construction in which the pawl 20 is rotated with the driven member, i.e. the drum 6, the pawl 20 is always in the same position when coincidence is reached. In the event a construction were to be used in which the pawl were pivotably mounted on the driving member rather than on the driven member operation would occur. However, the pawl position at coincidence might be at any angular position with respect to the actuating shoe 22. Thus, there is the possibility of erratic operation because there might not be enough time for reliable deactivation.

In the operation of the phasing mechanism in accordance with the invention, in the event coincidence is obtained between the recorder and the transmitter, the solenoid 42 remains deenergized and the pawl 20 has its forward tooth 34 engaged with one of the teeth of the ratchet wheel 12 thereby rotating the drum 6 at synchronous speed by the motor 27.

In the event the control circuit determines that the helix 7 and the drum 6 are out of phase with the transmitted signal, the solenoid 42 is energized to move the actuating shoe 22 so that its cam surface 39 is brought into contact with the cam surface 37 of the pawl 20, the pawl 20 is then swung about its pivot 21 so that its rear tooth 36 contacts sliding surface 31 of one of the teeth of the ratchet wheel 12. The pressure of the tooth 36 against the sliding surface 31 causes relative motion between the ratchet wheel 12 and the pawl supporting disc 17. A braking action also takes place between the helix and linear electrodes and the recording paper. Thus the angular position of the ratchet wheel 12 and an end of the helix 7 is changed at the rate of one tooth or step per revolution. As the cam surface 37 of the pawl 20 leaves the cam surface 39 of the actuating shoe 22 the pawl 20 is released and under the action of its spring 40 its forward tooth 34 engages a stop surface 30 of the next tooth of the ratchet wheel 12.

There is now time for the electrical control mechanism to determine whether or not the phasing pulses are in coincidence, and if so, the solenoid 42 is deenergized and the drum 6 is in phase. In the event the control circuit determines that coincidence is not present, the operation is continued until phasing occurs.

While the invention has been described and illustrated with reference to a specific embodiment thereof it will be understood that other embodiments may be resorted to without departing from the invention. Therefore, the form of the invention set out above should be considered as illustrative and not as limiting the scope of the following claims.

I claim:

1. A facsimile phasing mechanism comprising a frame, a shaft carried by the frame, a helix drum fixed to the shaft for rotation therewith, a helix electrode positioned on the helix drum, the helix having a backstroke portion defined by an angular space between the ends of the helix electrode, a linear electrode carried by the frame and cooperating with the helix electrode, a driving gear carried by the shaft and rotatable thereon, a ratchet wheel supported by the shaft and rotatable with respect thereto, means driving the ratchet wheel by the driving gear, the ratchet wheel having a plurality of teeth thereon, a pawl supporting member fixed to the shaft for rotation therewith, a pawl pivot pin carried by the pawl supporting member and positioned about ninety degrees behind the backstroke portion, a pawl pivotably mounted on the pawl pivot pin engaging the ratchet teeth, a cam surface for the pawl on its side opposite to its teeth, an actuating shoe pivotably supported on the frame in juxtaposition to the pawl, the actuating shoe having a cam engaging surface for contact with the cam surface of the pawl, a solenoid, an operating plunger for the solenoid, means operatively connecting the plunger to the actuating shoe, whereby upon energization of the solenoid the actuating shoe cam engaging surface contacts the pawl cam for pivotable movement of the pawl thereby effecting a step by step change in the relative angular position of the helix drum with respect to the angular position of the driving gear.

2. A facsimile phasing mechanism comprising a frame, a shaft carried by the frame, a helix drum fixed to the shaft for rotation therewith, a helix electrode positioned on the helix drum, the helix having a backstroke portion defined by an angular space between the ends of the helix electrode, a linear electrode carried by the frame and cooperating with the helix electrode, a driving gear carried by the shaft and rotatable thereon, a ratchet wheel supported by the shaft and rotatable with respect thereto, means driving the ratchet wheel by the driving gear, the ratchet wheel having a plurality of teeth thereon, a pawl supporting member fixed to the shaft for rotation therewith, a pawl pivot pin carried by the pawl supporting member and positioned about ninety degrees behind the backstroke portion, a pawl pivotably mounted on the powl pivot pin engaging the ratchet teeth, a cam surface for the pawl on its side opposite to its teeth, an actuating shoe pivotably supported on the frame in juxtaposition to the pawl, the actuating shoe having a cam engaging surface for contact with the cam surface of the pawl, the length of the actuating shoe cam engaging surface being such that its actuation arc is approximately one quarter of a revolution, a solenoid, an operating plunger for the solenoid, means operatively connecting the plunger to the actuating shoe, whereby upon energization of the solenoid the actuating shoe cam engaging surface contacts the pawl cam for pivotable movement of the pawl thereby effecting a step by step change in the relative angular position of the helix drum with respect to the angular position of the driving gear.

3. A facsimile phasing mechanism comprising a frame, a shaft carried by the frame, a helix drum fixed to the shaft for rotation therewith, a helix electrode positioned on the helix drum, the helix having a backstroke portion defined by an angular space between the ends of the helix electrode, a linear electrode carried by the frame and cooperating with the helix electrode, a driving gear carried by the shaft and rotatable thereon, a ratchet wheel supported by the shaft and rotatable with respect thereto, means driving the ratchet wheel by the driving gear, the ratchet wheel having a plurality of teeth thereon, a pawl supporting member fixed to the shaft for rotation therewith, a pawl pivot pin carried by the pawl supporting member and positioned about ninety degrees behind the backstroke portion, a pawl pivotably mounted on the pawl pivot pin engaging the ratchet teeth, a cam surface for the pawl on its side opposite to its teeth, an actuating shoe pivotably supported on the frame in juxtaposition to the pawl, the actuating shoe having a cam engaging surface for contact with the cam surface of the pawl, the actuating shoe so positioned that the point of contact of its cam engaging surface with the cam surface of the pawl is about one hundred and eighty degrees from the linear electrode, a solenoid, an operating plunger for the solenoid, means operatively connecting the plunger to the actuating shoe, whereby upon energization of the solenoid the actuating shoe cam engaging surface contacts the pawl cam for pivotable movement of the pawl thereby effecting a step by step change in the relative angular position of the helix drum with respect to the angular position of the driving gear.

4. A facsimilie phasing mechanism comprising a frame, a shaft carried by the frame, a helix drum fixed to the shaft for rotation therewith, a helix electrode positioned on the helix drum, the helix having a backstroke portion defined by an angular space between the ends of the helix electrode, a linear electrode carried by the frame and cooperating with the helix electrode, a driving gear carried by the shaft and rotatable thereon, a ratchet wheel supported by the shaft and rotatable with respect thereto, means driving the ratchet wheel by the driving gear, said means being a coupling spring operatively connected between the driving gear and the ratchet wheel, the ratchet wheel having a plurality of teeth thereon, a pawl supporting member fixed to the shaft for rotation therewith, a pawl pivot pin carried by the pawl supporting member and positioned about ninety degrees behind the backstroke portion, a pawl pivotably mounted on the pawl pivot pin engaging the ratchet teeth, a cam surface for the pawl on its side opposite to its teeth, an actuating shoe pivotably supported on the frame in juxtaposition to the pawl, the actuating shoe having a cam engaging surface for contact with the cam surface of the pawl, a solenoid, an operating plunger for the solenoid, means operatively connecting the plunger to the actuating shoe, whereby upon energization of the solenoid the actuating shoe cam engaging surface contacts the pawl cam for pivotable movement of the pawl thereby effecting a step by step change in the relative angular position of the helix drum with respect to the angular position of the driving gear.

5. A facsimile phasing mechanism comprising a frame, a shaft carried by the frame, a helix drum fixed to the shaft for rotation therewith, a helix electrode positioned on the helix drum, the helix having a backstroke portion defined by an angular space between the ends of the helix electrode, a linear electrode carried by the frame and cooperating with the helix electrode, a driving gear carried by the shaft and rotatable thereon, a ratchet wheel supported by the shaft and rotatable with respect thereto, means driving the ratchet wheel by the driving gear, said means being a coupling spring operatively connected between the driving gear and the ratchet wheel, the ratchet wheel having a plurality of teeth thereon, a pawl supporting member fixed to the shaft for rotation therewith, a pawl pivot pin carried by the pawl supporting member and positioned about ninety degrees behind the backstroke portion, a pawl pivotably mounted on the pawl pivot pin engaging the ratchet teeth, a cam surface for the pawl on its side opposite to its teeth, an actuating shoe pivotably supported on the frame in juxtaposition to the pawl, the actuating shoe having a cam engaging surface for contact with the cam surface of the pawl, the lentgh of the actuating shoe cam engaging surface being such that its actuation arc is approximately one quarter of a revolution, the actuating shoe so positioned that the point of contact of its cam engaging surface with the cam surface of the pawl is about one hundred and eighty degrees from the linear electrode, a solenoid, an operating plunger for the solenoid, means operatively connecting the plunger to the actuating shoe, whereby upon energization of the solenoid the actuating shoe cam engaging surface contacts the pawl cam for pivotable movement of the pawl thereby effecting a step by step change in the relative angular position of the helix drum with respect to the angular position of the driving gear.

6. A facsimile phasing mechanism comprising a frame, a shaft carried by the frame, a helix drum fixed to the shaft for rotation therewith, a helix electrode positioned on the helix drum, the helix having a backstroke portion defined by an angular space between the ends of the helix electrode, a linear electrode carried by the frame and cooperating with the helix electrode, a driving gear carried by the shaft and rotatable thereon, a ratchet wheel supported by the shaft for rotation with respect thereto, the ratchet wheel having a plurality of teeth thereon each with a stop face and a sliding face, mounting pins extending from both the driving gear and the ratchet wheel, a coupling spring engaging said pins, a pawl supporting member rotatable with the helix, a pawl pivot pin carried by the pawl supporting member and positioned about ninety degrees behind the helix backstroke portion, a pawl pivotably mounted on the pawl pivot pin, means forming a leading tooth and a trailing tooth for the pawl on one side thereof, the leading tooth having a tooth engaging surface matching the stop faces of the teeth on the ratchet wheel, the trailing tooth having a rounded tip to slide over successive sliding faces of the teeth on the ratchet wheel and an angular surface to abut against the stop faces thereof, a cam surface for the pawl on its side opposite to its teeth, a spring return for the pawl, an actuating shoe pivotably supported on the frame in juxtaposition to the pawl, a return spring for the actuating shoe, the actuating shoe having a cam engaging surface for contact with the cam surface of the pawl, the length of the cam engaging surface of the actuating shoe being such that its actuation arc is approximately one quarter of a revolution, the actuating shoe so positioned that the point of contact of its cam engaging surface with the cam surface of the pawl is about one hundred and eighty degrees from the linear electrode, a solenoid, an operating plunger for the solenoid, means operatively connecting the plunger to the actuating shoe, whereby upon energization of the solenoid the actuating shoe cam contacts the pawl cam for pivotable movement of the pawl thereby effecting a step by step change in the relative angular position of the helix drum with respect to the angular position of the driving gear.

References Cited by the Examiner

UNITED STATES PATENTS

| | | | |
|---|---|---|---|
| 1,985,654 | 12/34 | Finch | 178—5 |
| 2,224,593 | 12/40 | Brown | 74—125.5 |
| 2,559,117 | 7/51 | Falk | 74—125.5 |
| 2,660,895 | 12/53 | Waters | 74—142 X |
| 2,900,840 | 8/59 | Greve | 74—142 X |

BROUGHTON G. DURHAM, *Primary Examiner.*